(12) United States Patent
Yasukaga et al.

(10) Patent No.: US 7,692,819 B2
(45) Date of Patent: Apr. 6, 2010

(54) IMAGE PROCESSING METHOD AND IMAGE PROCESSING APPARATUS

(75) Inventors: Masayuki Yasukaga, Hachioji (JP); Tomohiro Suzuki, Nishitokyo (JP); Yuji Tamura, Hachioji (JP); Tetsuya Ishikawa, Hachioji (JP); Hiroyasu Nishimura, Hachioji (JP); Tomoya Ogawa, Hachioji (JP); Fumikage Uchida, Asaka (JP); Nao Moromizato, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1352 days.

(21) Appl. No.: 11/135,561

(22) Filed: May 24, 2005

(65) Prior Publication Data

US 2006/0126096 A1    Jun. 15, 2006

(30) Foreign Application Priority Data

Dec. 9, 2004    (JP) ............................. 2004-356119

(51) Int. Cl.
    *H04N 1/40* (2006.01)
(52) U.S. Cl. ...................................... 358/3.28; 358/468
(58) Field of Classification Search .................. 358/1.9, 358/2.1, 3.28, 468
    See application file for complete search history.

(56) References Cited

U.S. PATENT DOCUMENTS

| 7,224,779 B2 * | 5/2007 | Finnigan ................... 379/88.23 |
| 7,224,799 B2 * | 5/2007 | Mase .......................... 380/241 |
| 2004/0034605 A1 * | 2/2004 | Khaishgi et al. .............. 705/75 |

FOREIGN PATENT DOCUMENTS

| JP | 07-023157 | 1/1995 |
| JP | 07-111582 | 4/1995 |
| JP | 07-298058 | 11/1995 |
| JP | 8-65438 | 3/1996 |
| JP | 2000-137587 | 5/2000 |
| JP | 2000-138589 | 5/2000 |
| JP | 2001-136366 | 5/2001 |
| JP | 2001-157034 | 6/2001 |

(Continued)

OTHER PUBLICATIONS

Japanese Office Action of Appln. No. 2004-356119 and English Translation.

*Primary Examiner*—Thomas D Lee
*Assistant Examiner*—Stephen M Brinich
(74) *Attorney, Agent, or Firm*—Finnegan, Henderson, Farabow, Garrett & Dunner, L.L.P.

(57) ABSTRACT

There is described an image processing apparatus which enables an additional image, such as a "Confidential" mark, to be added to an original image only during the period when it is necessary to be outputted. The image processing apparatus includes an image signals obtaining section which obtains image signals corresponding to an image; an additional image setting section which sets an additional image with the image corresponding to the image signals; a day and time information setting section which sets a day and time information used for judging whether the image is outputted with or without an additional image in outputting the image based on the image signals; and a judgment section which judges whether date and time information meets date and time for output when the image is outputted based on the image signals.

49 Claims, 13 Drawing Sheets

FOREIGN PATENT DOCUMENTS

| | | |
|---|---|---|
| JP | 2002-135560 | 5/2002 |
| JP | 2003-076533 | 3/2003 |
| JP | 2003-264684 | 9/2003 |
| JP | 2004-112357 | 4/2004 |
| JP | 2004-188910 | 7/2004 |
| JP | 2004-227447 | 8/2004 |
| JP | 2004-260616 | 9/2004 |
| JP | 2004-303095 | 10/2004 |

* cited by examiner

FIG. 2(a)
FIG. 2(b)
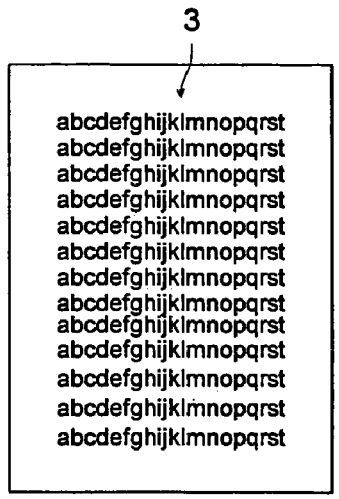
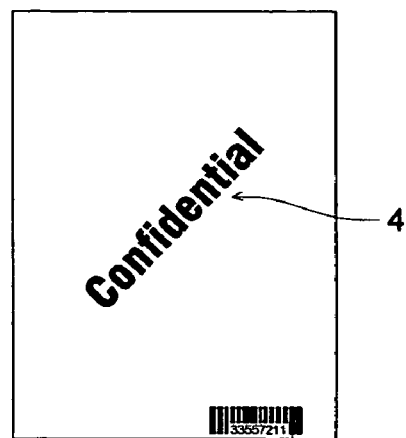
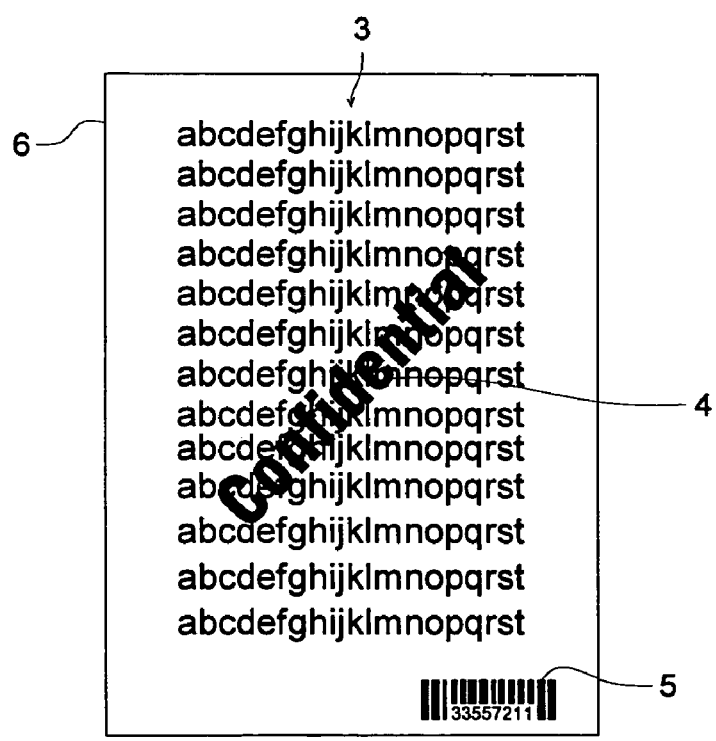
FIG. 2(c)

FIG. 7
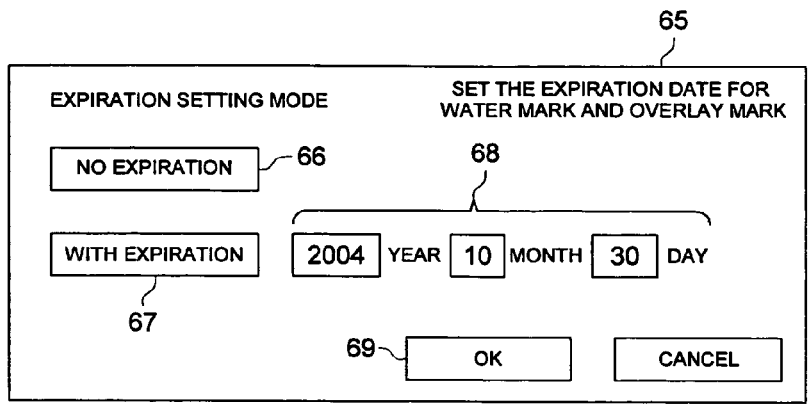
FIG. 8
| ORIGINAL IMAGE NAME | ADDITIONAL IMAGE NAME | EXPIRATION DATE |
|---|---|---|
| N21467.bmp | WM-N03 | SEPTEMBER 18, 2005 |
| N22000.bmp | WM-N01 | NO EXPIRATION |
| N22005.bmp | aabbb. jpg | OCTOBER 3, 2005 |
FIG. 9
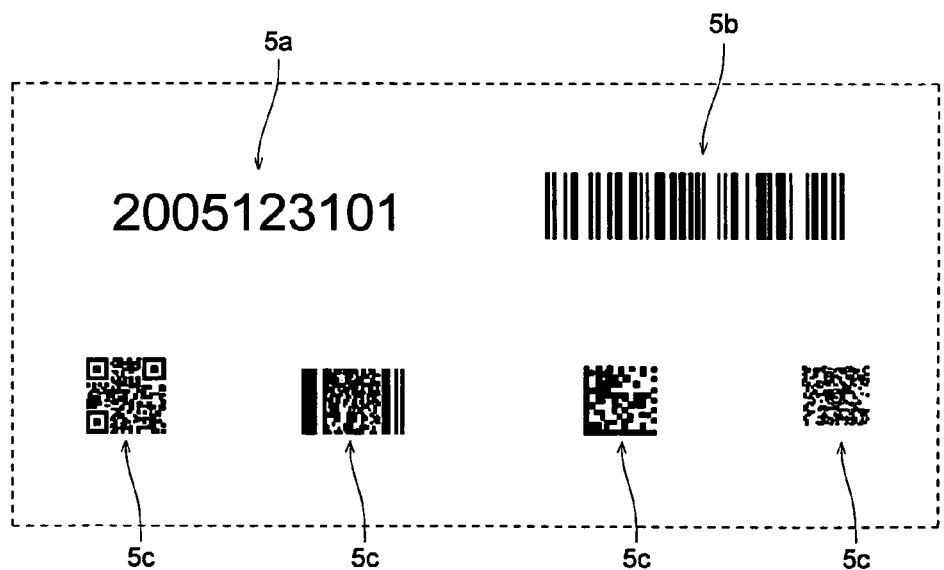

| MOVIE HAND BILL.doc | | | | |
|---|---|---|---|---|
| PROVIDER INFORMATION | NAME OF ADDITION AREA | ADDITION START DATE | ADDITION END DATE | |
| URL1/SOON TO BE RELEASED.img | FIRST IMAGE AREA | ---- | 11/30/2005 | ←281 |
| URL2/COMING SOON.img | FIRST IMAGE AREA | 12/1/2005 | 12/19/2005 | ←282 |
| URL3/NOW SHOWING.img | FIRST IMAGE AREA | 12/20/2005 | ---- | ←283 | though but# IMAGE PROCESSING METHOD AND IMAGE PROCESSING APPARATUS

This application is based on Japanese Patent Application NO. 2002-356119 filed on Dec. 9, 2004 in Japanese Patent Office, the entire content of which is hereby incorporated by reference.

BACKGROUND

1. Field of the Invention

The present invention relates to an image processing apparatus which can add an additional image, such as a water mark, to an image to be processed and output those images, and specifically relates to a technology that enables an additional image to be added only when the image is outputted during a certain period in which the additional image has to be added.

2. Description of the Related Art

Conventionally, in order to prevent confidential information printed on recording paper from leaking or being reproduced without permission, the "Confidential" or "No reproduction" mark is printed as an overlay print. Also, to prevent improper reproduction on the machine side, there is an image forming apparatus which detects whether a specific barcode is attached to a document to be reproduced, and prohibits the reproduction of the document when the barcode is attached to the document (for example, see Patent Document 1).

[Patent Document 1] Published Unexamined Japanese Patent Application No. Hei 8-65438

Some confidential information has a confidentiality expiration date. For example, a product catalog is confidential before the product is released, but, after the product has been on the market, it becomes public information. Therefore, it is necessary to print the "Confidential" mark on such printed matter before the confidentiality time expires. However, it is not necessary to add the "Confidential" mark after the confidentiality time has expired.

However, if print data is initially created with the "Confidential" mark attached, when the print data is used for printing after the confidentiality time has expired, the "Confidential" mark is still printed. Therefore, it is necessary to create another print data that does not have the "Confidential" mark, and also to judge which print data, with or without the mark, should be used when printing is to be done based on the expiration date of the confidentiality.

Furthermore, there is a problem in that when a document with the "Confidential" mark attached is reproduced by a copier after the confidentiality expiration date has passed, the reproduced document still has the unnecessary "Confidential" mark.

Besides the above, in some cases, a pamphlet for a newly released car has only descriptions and no photos of the car until the day the car is released, and once the car has been released, the pamphlet has both the descriptions and photos. Moreover, there is a need for printing a different text image according to the period when the image is outputted. For example, in a movie hand bill, the text image of "Coming soon" may be printed at the beginning, "Coming (on a certain date)" may be printed when the date of release approaches, and "Now showing" may be printed after the movie has been released.

To respond to such demand, in the conventional technology, a plurality of print data each of which adds a different additional image, such as a "Confidential" mark, photo, or characters, to an original image, must be individually created, and properly used according to when the data is printed. This is a problem that involves a considerable amount of time and effort for the management.

SUMMARY

In view of foregoing, an object of this invention is to provide new image processing apparatus. The apparatus comprises, an image signals obtaining section which obtains image signals corresponding to an image; an additional image setting section which sets an additional image with the image corresponding to the image signals; and a day and time information setting section which sets a day and time information used for judging whether the image is outputted with or without an additional image in outputting the image based on the image signals.

In another aspect of the invention, the apparatus comprises, an image signals obtaining section which obtains image signals corresponding to an image; a judgment section which judges whether date and time information meets date and time for output when the image is outputted based on the image signals, wherein the date and time information is used for judging whether the image is outputted with or without an additional image; and an output section which outputs the image with or without the additional image in accordance with a result of judgment whether the date and time information meets the date and time for output.

BRIEF DESCRIPTION OF THE DRAWINGS

Other objects and advantages of the present invention will become apparent upon reading the following detailed description and upon reference to the drawings in which:

FIG. 2(a), FIG. 2(b) and FIG. 2(c) are explanatory drawings showing an original image, a water mark (additional image) and its expiration date information mark, which are combined with the original image, and a document on which those images are combined, respectively;

FIG. 7 is an explanatory drawing showing an example of the expiration setting screen displayed by an image forming apparatus;

FIG. 8 is an explanatory drawing showing an example of settings relating to an additional image stored in the storage section of an image forming apparatus;

FIG. 9 is an explanatory drawing showing an example of various information marks;

In the following description, like parts are designated by like reference numbers throughout the several drawings.

DETAILED DESCRIPTION OF THE PREFERRED EMBODIMENT

Hereafter, various embodiments of the present invention will be explained with reference to the drawings.

Figure 1:
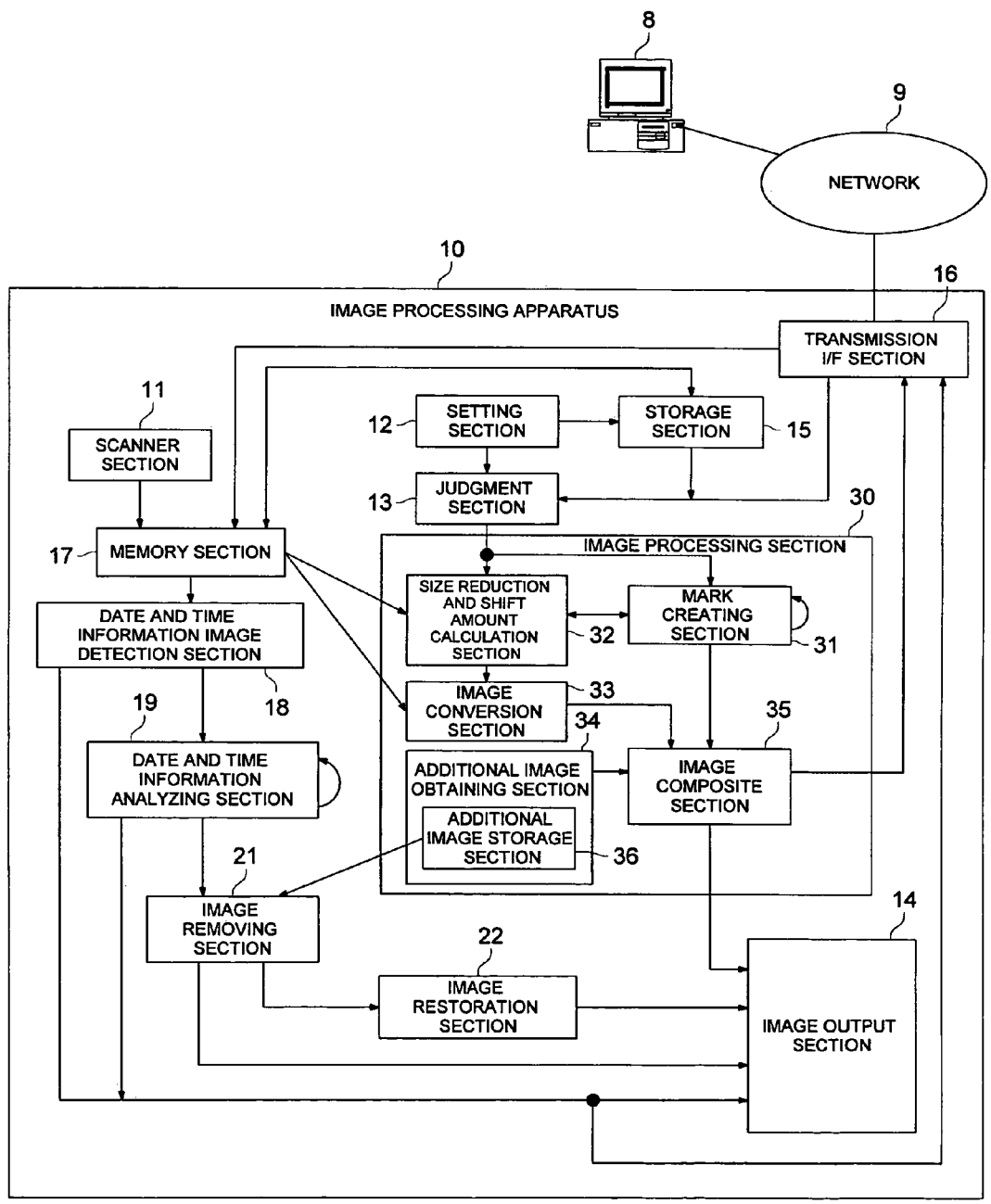
FIG. 1 is a block diagram showing the configuration of an image forming apparatus according to a first embodiment of the present invention.

FIG. 1 shows the functional configuration of an image forming apparatus 10 according to a first embodiment of the present invention. An image processing method according to the present invention applies to the image forming apparatus 10 which includes a function to specify date and time information that becomes a reference for whether to add or not to add an additional image, such as a "Confidential" mark, to an original image that has been obtained by reading a document by a scanner. Moreover, an image forming apparatus 10 is shown as an example of an image processing apparatus to which an image processing method according to the present invention applies; however, the present invention is not intended to be limited to the apparatus.

For example, when adding an additional image 4 that is the character string for "Confidential", shown in FIG. 2(b), as a water mark on an original image 3 shown in FIG. 2(a), a user can make settings for the expiration date of the additional image 4. And, as shown in FIG. 2(c), a function is provided to output a composite image that combines an information mark (date and time information image) 5 which indicates the expiration date (date and time information) as an image such as a barcode, and an additional image 4 with an original image 3, and print the composite image on the recording paper 6. Moreover, in cases when the recording paper 6 on which the composite image has been printed is reproduced by a specific copier, if the reproduction date and time is prior to the expiration date indicated by the information mark (date and time information image) 5, the reproduced result includes an original image 3 together with an additional image 4 and a date and time information image 5; and if the reproduction date and time is after the expiration date, the additional image 4 and the date and time information image 5 are removed and only the original image 3 is reproduced.

In a first embodiment, an explanation will be given on the premise that date and time information is expiration date information that indicates the end of the period during which an additional image is to be added. Furthermore, the additional image can be a water mark or an overlay image.

As shown in FIG. 1, an image forming apparatus 10, which is configured as stated above, comprises a scanner section 11 which obtains corresponding image data (original image signals) by reading a document as an image data obtaining section; a setting section 12 (including an additional image setting section and a date and time information setting section) that executes the additional image selection and the expiration date setting; a judgment section 13 that judges whether image output date and time matches date and time information based on the settings specified for the original image and determines whether to add or not to add the additional image; an image processing section 30 that combines an information mark which indicates an expiration date, additional image, and an original image; and an image output section 14 that converts the image data into visible data and outputs the data. The image output section 14 includes a display section, such as a liquid crystal display, and/or a printer section that forms images on the recording paper.

The setting section 12 comprises a display section, such as a liquid crystal display, touch panel located on its screen, and other operation switches, and the setting section 12 is a part of the operation display section of the image forming apparatus 10.

Moreover, the image forming apparatus 10 includes a storage section 15 that stores settings relating to the additional image and the expiration date specified by the setting section 12 by associating the data with the corresponding original image.

The image processing section 30 comprises a mark creating section 31, size reduction and shift amount calculation section 32, image conversion section 33, additional image obtaining section 34, and an image composite section 35. The mark creating section 31 creates an information mark that displays data specified by the setting section 12 as an image such as a barcode.

The image conversion section 33 reduces or shifts an original image or an additional image in order to create space for combining an information mark on the page. The size reduction and shift amount calculation section 32 calculates the degree of size reduction and the amount of shift that are transmitted to the image conversion section 33.

The additional image obtaining section 34 obtains additional image data. The additional image obtaining section 34 includes an additional image storage section 36 that has stored image data, such as a water mark, relating to the prescribed additional image, and obtains the prescribed additional image from the additional image storage section 36 unless otherwise specified. If an additional image provider is not the additional image storage section 36, but is specified separately, the additional image obtaining section 34 obtains the additional image from the provider. For example, the additional image obtaining section 34 includes a function to obtain an additional image from the hard disk unit located within the image forming apparatus 10 or from an external file server.

The image composite section 35 creates composite image data that combines an original image, additional image, and an information mark created by the mark creating section 31. Furthermore, if an original image or additional image has been reduced or shifted by the image conversion section 33, the image composite section 35 combines the converted images with the information mark.

In addition to the above functions, the image forming apparatus 10 comprises a transmission and reception I/F section 16 that functions as an image data obtaining means, memory section 17, date and time information image detection section 18, date and time information analyzing section 19, image removing section 21, and an image restoration section 22. The transmission and reception I/F section 16 sends and receives various kinds of data to and from an image processing apparatus 200, described later in this document, and an external apparatus 8 via a network 9 such as a LAN (local area network). The memory section 17 temporarily stores image data obtained by reading a document by the scanner section 11 and print data received from an external apparatus 8 by the transmission and reception I/F section 16.

The date and time information image detection section 18 detects an information mark (date and time information image) by analyzing image data stored in the memory section 17. The date and time information analyzing section 19 analyzes an information mark detected by the date and time information image detection section 18 and recognizes the indicated information content. When image data has been received from an external apparatus 8 via a network 9, or when data stored in the image forming apparatus 10 has been read, the date and time information analyzing section 19 judges whether the image data is accompanied by date and time information, and if it recognizes that the image data is accompanied by the information, the date and time information analyzing section 19 analyzes the date and time information and recognizes the content. The image removing section 21 removes an additional image, such as a water mark, or an information mark from image data. The image restoration section 22 restores images, which have been reduced or shifted to combine an information mark, to their original conditions by enlarging or shifting the images.

Moreover, the date and time information analyzing section 19 includes a function to judge whether the image output date and time matches date and time information, and therefore, it may also function as a judgment section 13. The image removing section 21 and/or the image restoration section 22 may also function as an image processing section 30.

Output image data (there are cases when only image data is used, or when image data and additional image data, and/or date and time information are used) outputted by the image composite section 35, date and time information image detection section 18, image removing section 21, and the image restoration section 22 has been stored in the image output section 14 and is displayed and printed by the image output section 14. Image data outputted by the image composite section 35 and the date and time information image detection section 18 has also been inputted into the transmission and reception I/F section 16 and can be transmitted to an external apparatus via a network 9.

Figure 3:
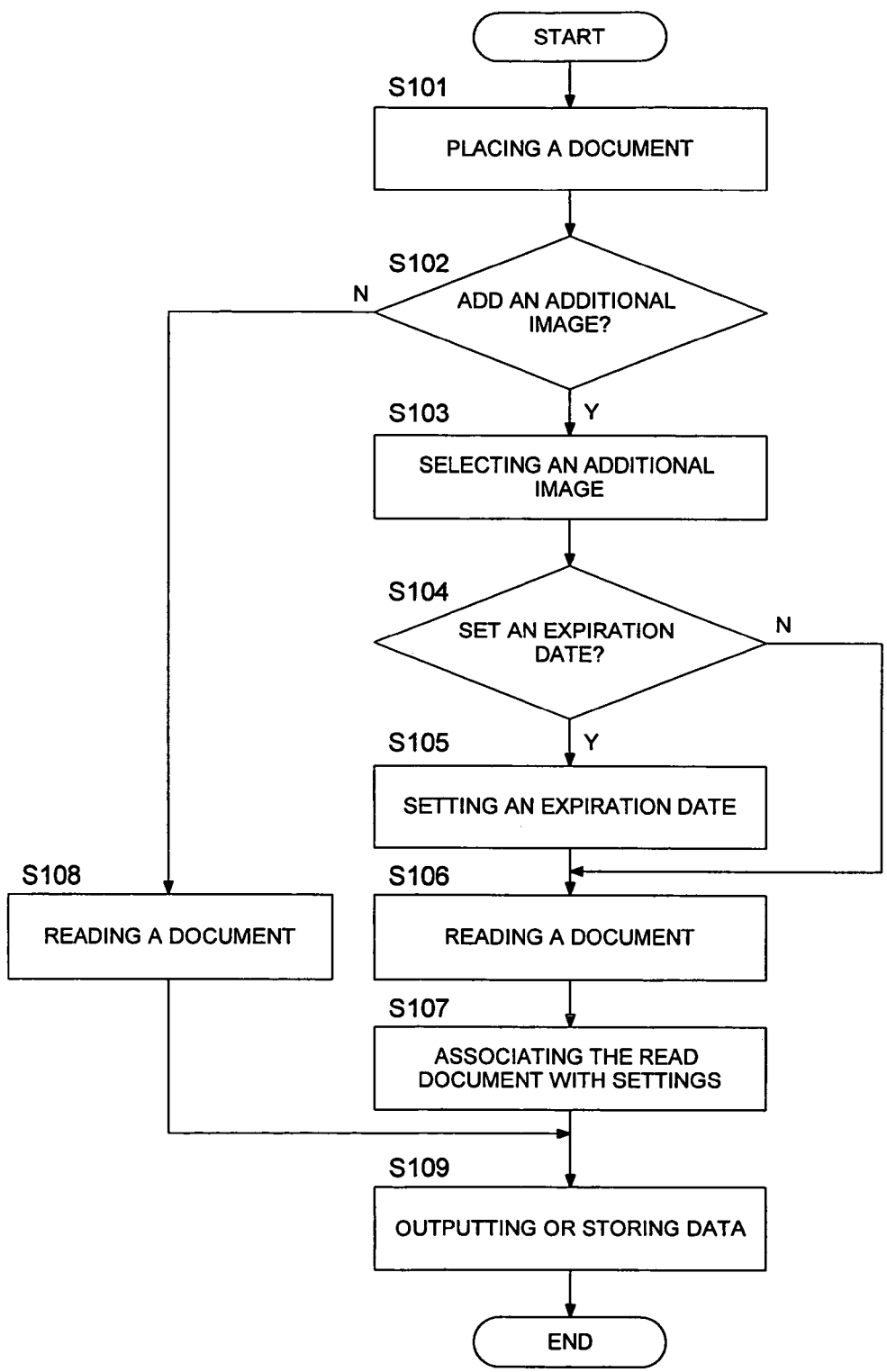
FIG. 3 is a flow chart showing the operations of an image forming apparatus according to an embodiment of the present invention by which an additional image and its expiration date are specified for a document image.

FIG. 3 shows the flow of the procedures for setting an additional image and its expiration date for a document image. First, a user places a document on the scanner section 11 (step S101) and then the user selects an operation that either adds or does not add an additional image, such as a water mark or overlay image, to the document by the setting section 12 (step S102).

When the addition of an additional image is selected (step S102; Y), which additional image is to be added is subsequently selected (step S103). Then, whether to specify or not to specify an expiration date for the additional image is selected (step S104). If the expiration date setting is specified (step S104; Y), the expiration date is subsequently set (step S105). It is possible to specify a plurality of additional images for one image data. In such a case, it is possible to specify date and time information for each additional image.

After the settings for whether to add an additional image have thus been made, the scanner section 11 reads a document (step S106), and the contents (expiration date, etc.) specified in steps S103 and S104 are associated with the scanned image data (step S107). That is, if an expiration date has not been specified (step S104; N), only the type of the additional image to be included is associated with, and if an expiration date has been specified (step S104; Y, S105), the type and the expiration date of the additional image is associated with the image scanned by the scanner section 11.

After that, the above settings will be stored in the storage section 15 by associating the settings with image data, or the image data will be outputted (printed or displayed) according to the settings (step S109), and then the procedure will end (end). If the operation not to add an additional image is selected (step S102; N), the scanner section 11 reads a document (step S108), and stores or prints the image (step S109), and the procedure will end (end).

Figure 4:
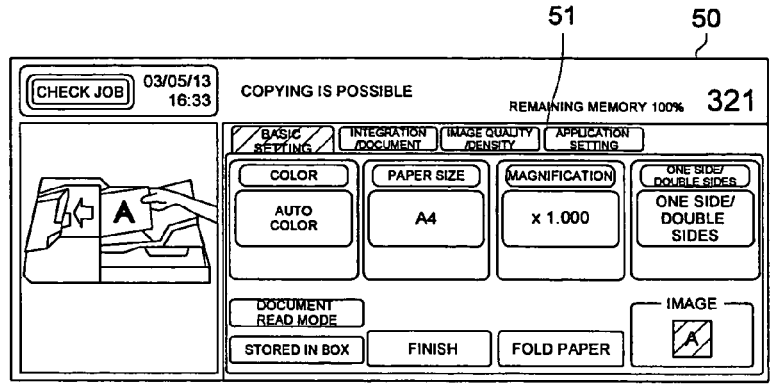
FIG. 4 is an explanatory drawing showing an example of the basic copy screen displayed by an image forming apparatus.
Figure 5:
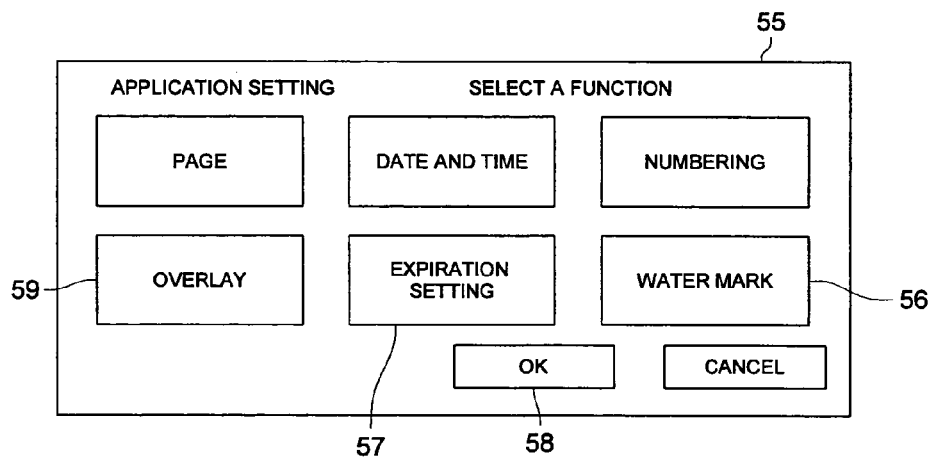
FIG. 5 is an explanatory drawing showing an example of the application setting screen displayed by an image forming apparatus.
Figure 6:
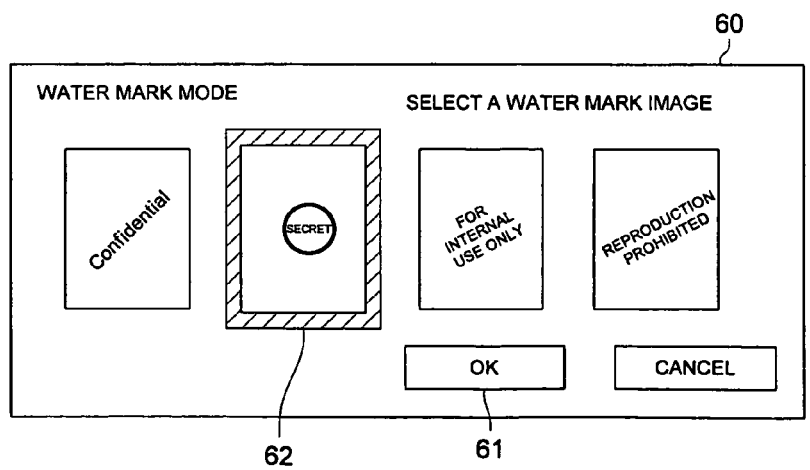
FIG. 6 is an explanatory drawing showing an example of the water mark image selection screen displayed by an image forming apparatus.

FIGS. 4 through 7 show various kinds of operation screens that are displayed when additional-image relating settings are made. FIG. 4 shows the basic copy screen 50 that is displayed when a document is placed on the scanner section 11. Operating the "Application setting" button 51 located on this screen will display the application setting screen 55 shown in FIG. 5. Operating the "Water mark" button 56 on the application setting screen 55 will display the water mark image selection screen 60 (FIG. 6) for selecting the type of the water mark to be added. By selecting any one of the prescribed water marks displayed on the screen 60 and operating the "OK" button 61, the water mark type is determined and the screen will return to the application setting screen 55 (FIG. 5). FIG. 6 shows the situation in which the "SECRET" water mark, encircled by a frame 62, is selected. Moreover, the way to select a desired additional image is not intended to be limited to this example of selecting an additional image from displayed sample images; and a desired additional image can be selected from an image storage (directory or URL) or can be inputted.

Operating the "Expiration setting" button 57 on the application setting screen 55 will display the expiration setting screen 65 (FIG. 7) for specifying an expiration date for the water mark that has been selected. On this screen 65, the "No expiration" button 66 and the "With expiration" button 67 are displayed, and by operating either button, it is possible to add a water mark with or without an expiration setting. The expiration date input field 68 is for entering an expiration date. By setting the expiration date and operating the "OK" button 69, the expiration date for adding the water mark is determined and the screen will return to the application setting screen 55 (FIG. 5). Moreover, operating the "OK" button 58 on the application setting screen 55 will determine the settings for the application function and the screen will return to the basic copy screen 50 (FIG. 4).

Moreover, by operating the "Overlay" button 59 on the application setting screen 55 (FIG. 5), it is possible to set any overlay image and its expiration date for adding the image by the operation screen, not shown.

The judgment section 13 controls contents to be printed by judging the settings for whether to add an additional image when the contents are printed. That is, when the settings of adding an additional image to the original image read by the scanner section 11 have been made and the output date matches the output expiration date, a composite image that combines the original image 3 with the additional image 4 and the information mark (date and time information image) 5 is printed as shown in FIG. 2(*c*). If the settings of adding an additional image have been made without specifying an expiration date (no expiration), the information mark (date and time information image) 5 is not included, and a composite image (not shown) that combines the original image 3 with only the additional image 4 is printed. When it is judged that an additional image is not to be added, only an original image 3 is printed as shown in FIG. 2(*a*).

If the data is not printed immediately but the settings are to be associated with an original image and stored, the settings are associated with an original image name 71, additional image name 72, and the expiration date 73 and stored in the storage section 15 as shown in FIG. 8. The original image name 71 is a file name assigned to the image data read by the scanner section 11 within the image forming apparatus 10. If original image data contained in a file is received from an external apparatus, the file name is used as an original image name. With regard to the additional image name 72, if an additional image is a prescribed water mark, an image number that has been assigned to the additional image is registered. The "WM-N03" shown in FIG. 8 corresponds to the situation. If an additional image is an overlay image, the image's file name ("aabbb.jpg" in FIG. 8) is registered.

When image data is read out from the storage section 15 and printed, the judgment section 13 controls contents to be printed by judging the settings for whether to add an additional image. For example, there is a situation in which the "N21467.bmp" image that has been registered at the top row in FIG. 8 is to be read out from the storage section 15 and printed. Settings have been made for the original image so that the "WM-N03" image is added as an additional image with the specified expiration date of Sep. 18, 2005. Therefore, if the original image, "N21467.bmp", is read out from the storage section 15 and printed prior to Sep. 18, 2005, a composite image that combines the original image with the additional image is printed. On the other hand, if the original image is printed after Sep. 18, 2005, only the original image is printed. Moreover, when the original image is printed according to contents stored in the storage section 15, an information mark (date and time information image) 5 may or may not be combined with an original image. It is recommended that it should be specified whether an information mark (date and time information image) 5 is to be combined or not.

FIG. 9 shows a variety of examples of the information mark (date and time information image) 5. The information mark (date and time information image) 5*a* displays date and time information, such as expiration date, as characters or symbols. The information mark (date and time information image) 5*b* is a one-dimensional barcode, and the information mark (date and time information image) 5*c*s are two-dimensional barcodes. FIG. 9 shows a plurality of two-dimensional barcodes that are different in standards.

In a case that the margin is not sufficient for combining when such the information mark is combined to the original image and outputted, a necessary space is created by reducing and/or shifting only the original image, only the additional image, or a combined image including the original image and the additional image.

Figure 10:
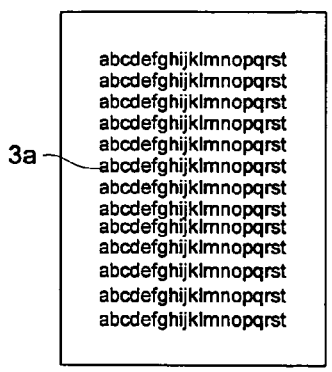
FIG. 10(a), FIG. 10(b) and FIG. 10(c) are explanatory drawings in which an information mark is combined in a space created by shifting an original image.
Figure 10:
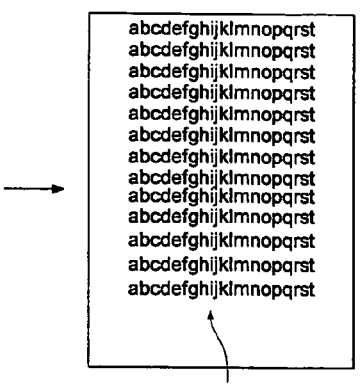
Figure 10:
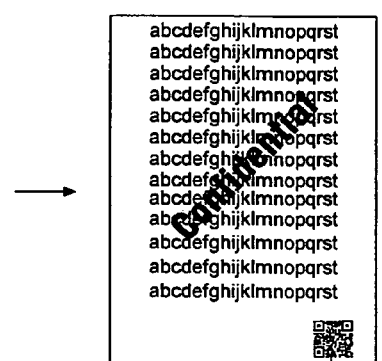

FIGS. 10(*a*) through 10(*c*) show examples in each of which an original image is shifted so as to combine an information mark. As shown in FIG. 10(*a*), because there is a margin above the original image 3*a*, the original image 3*a* has been shifted up to ensure a necessary amount of space 81 at the bottom (FIG. 10(*b*)), and an information mark (date and time information image) 5*c* is combined therein (FIG. 10(*c*)).

Figure 11:
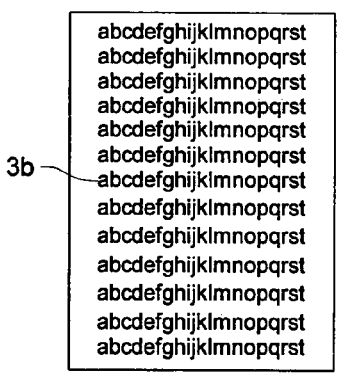
FIG. 11(a), FIG. 11(b) and FIG. 11(c) are explanatory drawings in which an information mark is combined in a space created by reducing an original image.
Figure 11:
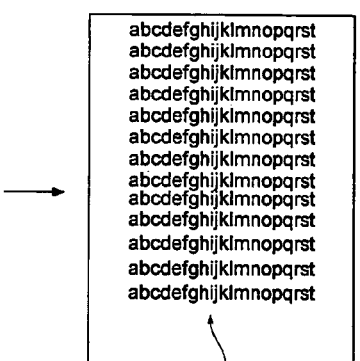
Figure 11:
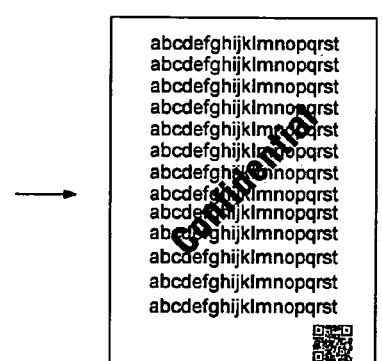

FIGS. 11(*a*) through 11(*c*) show examples in each of which an original image is reduced so as to combine an information mark. As shown in FIG. 11(*a*), because there are almost no margins both above and below the original image 3*b*, it is not possible to create space for combining images. Therefore, in such a case, the original image 3*a* is reduced to create space 82 (FIG. 11(*b*)) in which an information mark (date and time information image) 5*c* is combined (FIG. 11(*c*)). Moreover, in an example shown in FIG. 11, because an information mark (date and time information image) 5*c* is included at the bottom of the page, the original image 3*a* is reduced leaving the center of the top end as a reference position, thereby creating an appropriate bottom margin.

Figure 12:
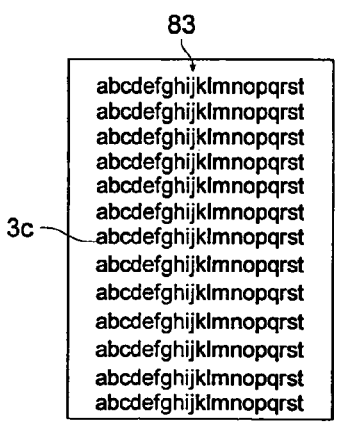
FIG. 12(a), FIG. 12(b) and FIG. 12(c) are explanatory drawings in which an information mark is combined in a space created by reducing and shifting an original image.
Figure 12:
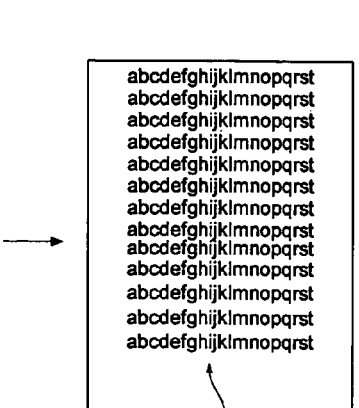
Figure 12:
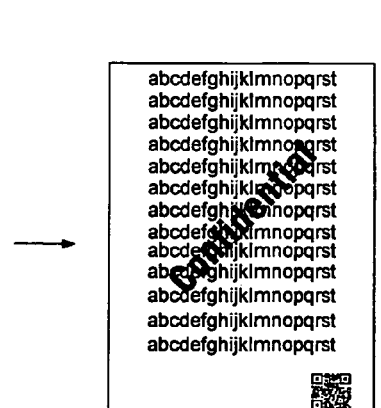

FIGS. 12(*a*) through 12(*c*) show examples in each of which an original image is reduced and shifted so as to combine an information mark. As shown in FIG. 12(*a*), because the top margin 83 is narrow, it is not possible to ensure space for combining an information mark (date and time information image) 5*c* by simply shifting up the original image 3*c*. Therefore, a space 84 has been created by shifting and reducing the original image (FIG. 12(*b*)), and an information mark (date and time information image) 5*c* is combined therein (FIG. 12(*c*)). In this example, the shifting operation takes priority over the size reduction operation, thereby preventing an original image from deteriorating.

Moreover, information marks can include the above-mentioned degree of size reduction and shift amount in addition to the expiration date. Furthermore, the information marks can also include the name of the person who has set the inclusion of an additional image and its expiration date, reset code for canceling the specified expiration date, additional image provider information (storage location, server name, file name of the additional image, and so on), and position information that indicates the additional image composite position. Moreover, it is possible to encrypt information such as an expiration date by using a prescribed encryption key or an encryption key specified by a user and then convert the information into an information mark.

Instead of applying the above embodiment, it is possible to externally obtain image data from an external apparatus 8. Furthermore, it is also possible to specify an additional image by an external apparatus 8. That is, an additional image setting means can be disposed in an external apparatus 8 instead of being disposed in an image forming apparatus 10 which is an image processing apparatus. Furthermore, it is possible to specify date and time information by an external apparatus 8. That is, a date and time information setting means can be disposed in an external apparatus 8 instead of being disposed in an image forming apparatus 10 which is an image processing apparatus.

Next, a second embodiment of the present invention will be explained.

Figure 13:
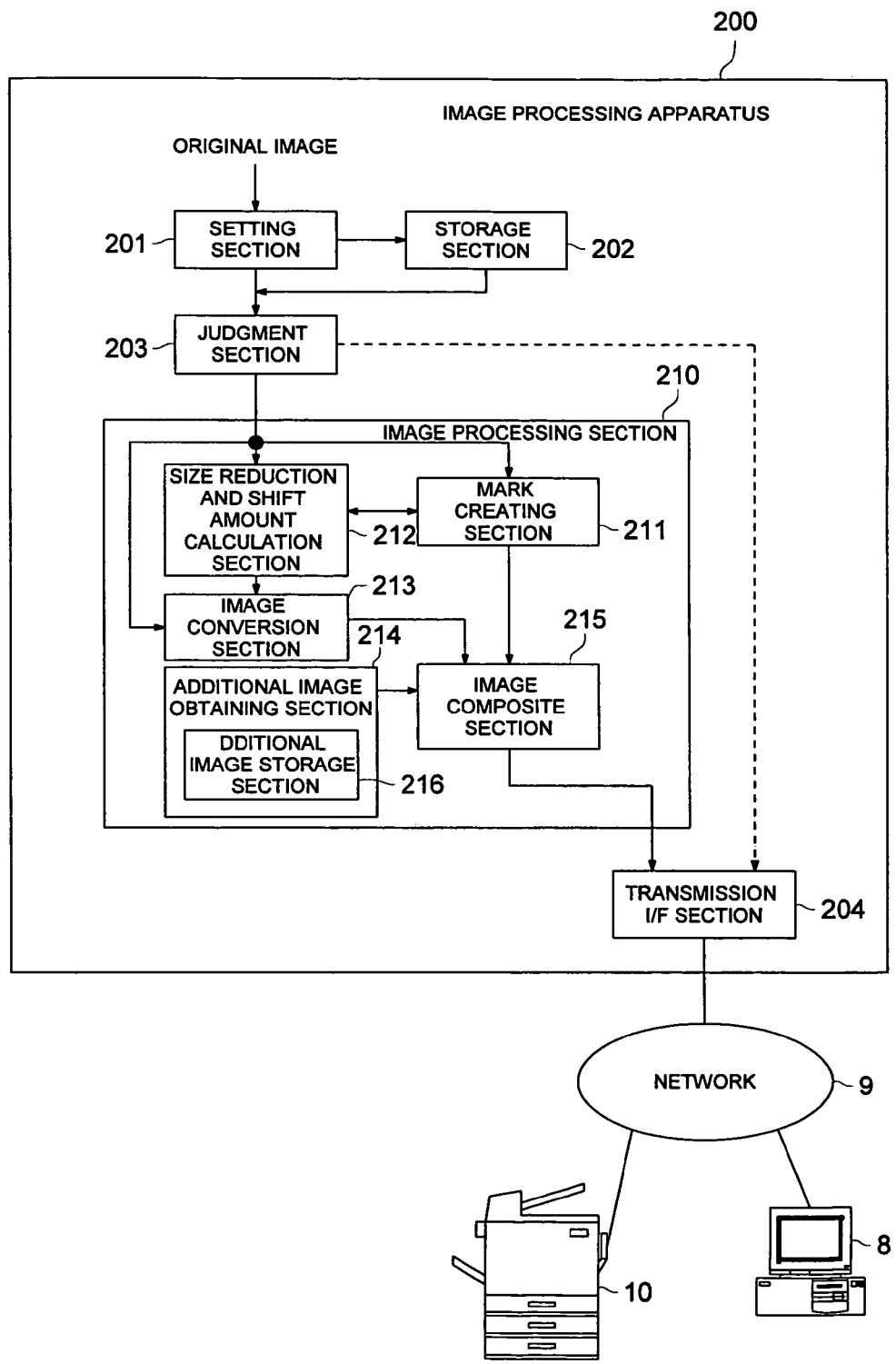
FIG. 13 a block diagram showing the configuration of an image processing apparatus according to a second embodiment of the present invention.

In a second embodiment, settings for whether to add an additional image are made by an image processing apparatus 200, such as a personal computer. FIG. 13 shows the functional configuration of an image processing apparatus 200 according to a second embodiment of the present invention. The image processing apparatus 200 is connected via a network 9 to an image forming apparatus 10 which includes an image output section (display section and/or printer section), external apparatus 8, or another printing apparatus.

With regard to image data (original image signals), an image processing apparatus 200 comprises a setting section 201, image processing section 210, storage section 202, judgment section 203, and a transmission and reception I/F section 204. The setting section 201 includes an additional image setting section that determines whether to add or not to add an additional image as well as determining the type of the additional image, and a date and time information setting section that specifies an expiration date, and the setting section 201 receives various kinds of settings for whether to add an additional image. The storage section 202 stores the settings received by the setting section 201 by associating the settings with the corresponding image data (original image signals).

The judgment section 203 judges whether the image output date and time matches date and time information, and determines whether to add or not to add an additional image based on the data specified for the original image. The image processing section 210 functions in the same manner as the image processing section 30 according to a first embodiment. That is, the image processing section 210 creates an information mark, reduces and shifts an original image or an additional image, and combines the original image with the additional image and the information mark. The transmission and reception I/F section 204 controls the transmission and reception of data to and from an external apparatus.

The image processing section 210 comprises a mark creating section 211, size reduction and shift amount calculation section 212, image conversion section 213, additional image obtaining section 214, and an image composite section 215; and the additional image obtaining section 214 includes an additional image storage section 216. The mark creating section 211, size reduction and shift amount calculation section 212, image conversion section 213, additional image obtaining section 214, image composite section 215, and an additional image storage section 216 function in the same manner as the mark creating section 31, size reduction and shift amount calculation section 32, image conversion section 33, additional image obtaining section 34, image composite section 35, and the additional image storage section 36, shown in FIG. 1, respectively. Herein, detailed descriptions of those sections are omitted.

Image data (original image signals) that is to be inputted into the setting section 201 has been previously created by the image processing apparatus 200 or a word processor. The setting section 201 functions as a printer driver that transmits the image data (print data) to a printing apparatus which is an external image output section. Image data that is to be inputted into the setting section 201 is code information (printer language information) which includes text characters, graphics, images, and their attributes (font type, character size, decoration, etc.) and information about the position within the page. In this embodiment, the image data obtaining section may be an application that can read out image data that has been stored by an application such as a word processor, or may be such an application as a word processor that can create new image data.

There is a case in which image data to be printed is first sent to the judgment section 203 and then processed by the image processing section 210, and subsequently transmitted to an external apparatus as a composite image that has combined an original image with an additional image and an information mark; and there is another case in which image data to be printed is first sent to the judgment section 203 and then directly transmitted to an external apparatus without being processed by the image processing section 210. In the latter case, settings for whether to add an additional image are transmitted as code information to an external apparatus that includes an image output section.

Figure 14:
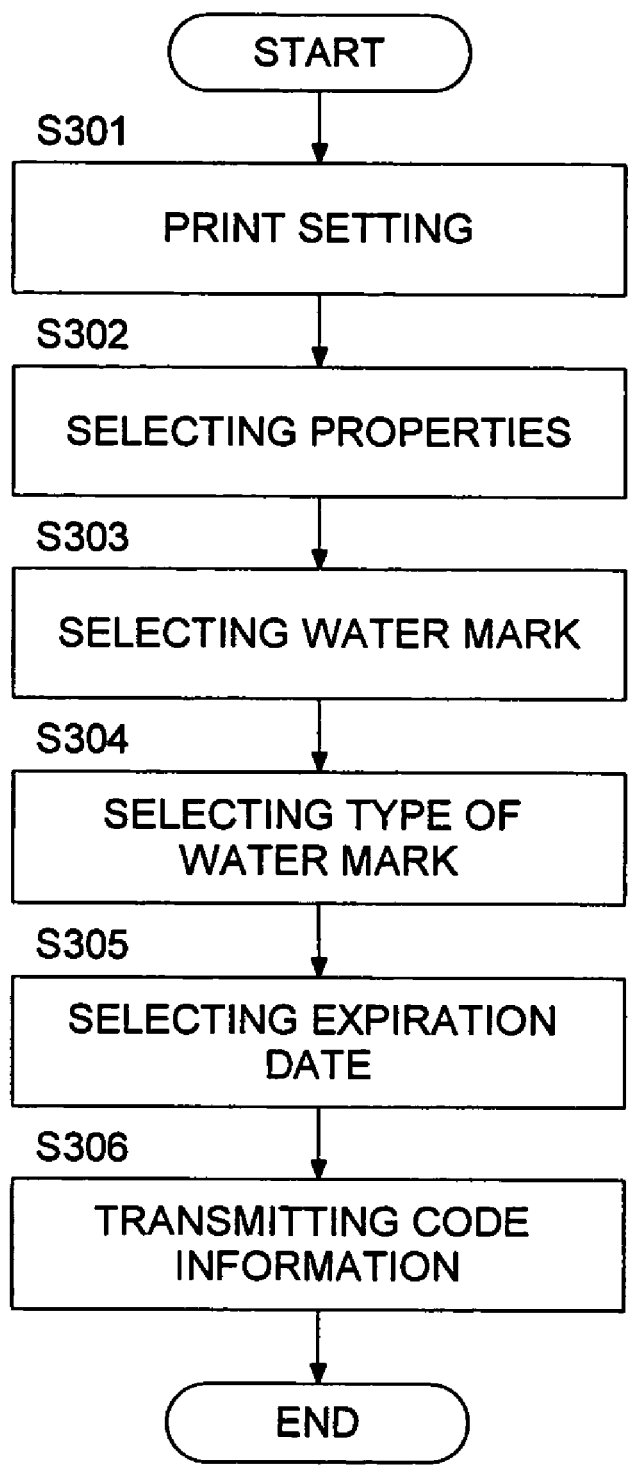
FIG. 14 is a flow chart showing the procedures by which an image processing apparatus's setting section specifies an additional image and its expiration date for an original image.

FIG. 14 shows the flow of procedures by which an image processing apparatus 200 transmits settings for whether to add an additional image as code information to an external apparatus. Furthermore, FIG. 15 shows the setting screen that is displayed on the display apparatus, not shown, when settings for whether to add an additional image are made.

Figure 15:
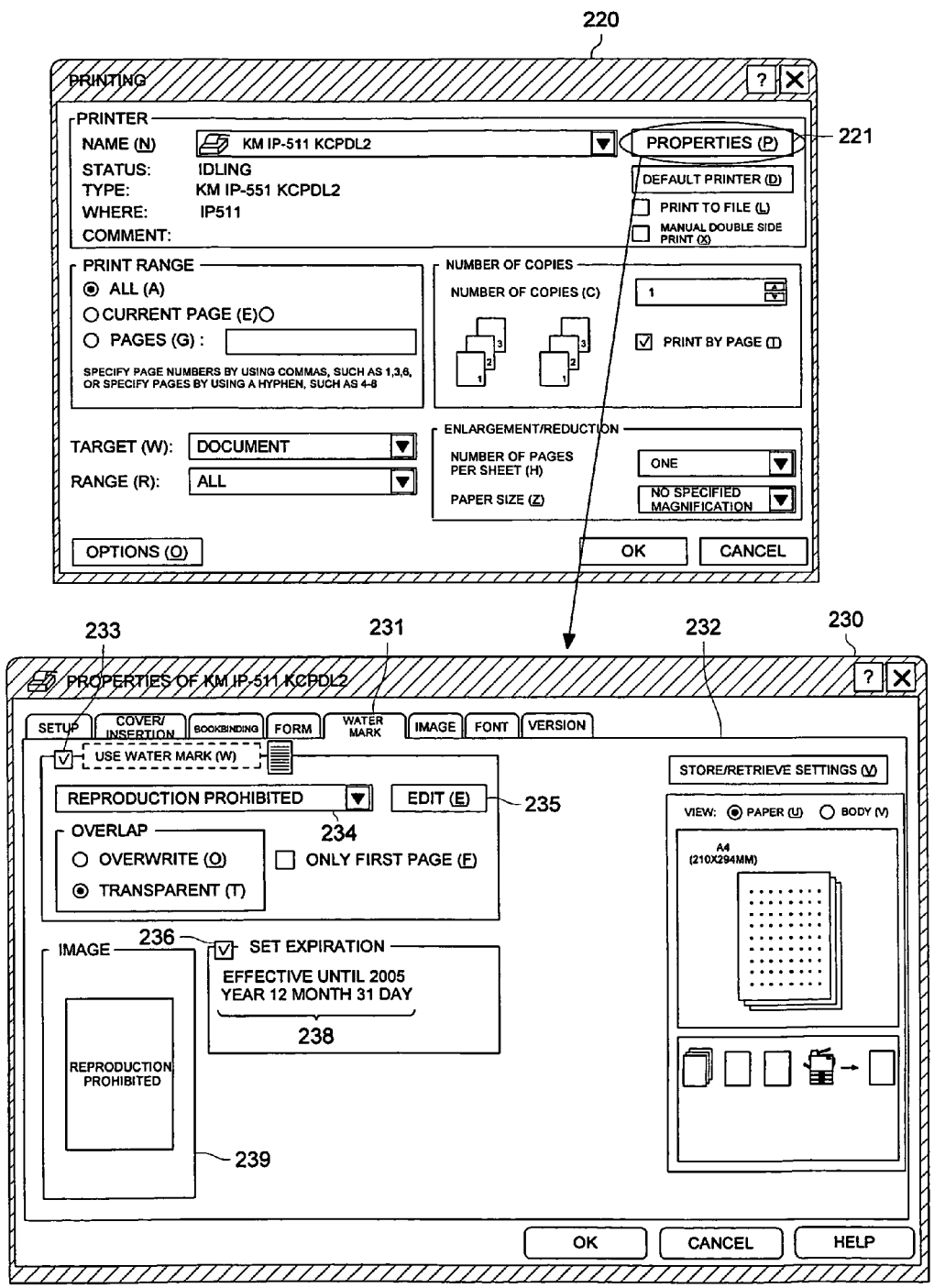
FIG. 15 is an explanatory drawing showing an example of the print screen and the properties screen displayed by an image processing apparatus.

A user selects print setting from a prescribed application that creates and edits an original image, and displays the print screen 220 shown in FIG. 15 (step S301 in FIG. 14). Furthermore, the user selects the "Properties" button 221 on the print screen 220 (step S302 in FIG. 14) to display the properties screen 230 shown at the lower section in FIG. 15, and then selects the "Water mark" tab 231 to display the water mark setting screen 232 (step S303). Subsequently, from the water mark setting screen 232, the user determines whether to add or not to add a water mark, and specifies the type of the water mark and its expiration date (steps S304 and S305).

Specifically, checking the check box 233 on the water mark setting screen 232, shown in FIG. 15, will make settings for adding a water mark. A user selects a water mark to be added from the list box 234 below. Furthermore, operating the "Edit" button 235 will display the edit screen, not shown, on which the water mark can be edited. Moreover, it is possible to determine whether to overwrite a water mark on the original image or to make the water mark a transparent image, or whether to include the water mark only on the first page.

Checking the "Expiration setting" check box 236 will make it possible to specify an expiration date for the water mark previously selected, and unchecking the check box 236 will specify "No expiration". An expiration date is inputted into the expiration date input field 238. Furthermore, the "Image" frame 239 on the water mark setting screen 232 displays the situation in which the selected water mark is added to the original image.

After settings for whether to add the water mark have been completed, when the printing operation is executed, the settings for whether to add the water mark together with original image data is transmitted as code information to the printing apparatus (step S306 in FIG. 14). In this case, the composite procedure for combining an original image with an information mark and an additional image is executed on the printing apparatus side. Furthermore, it is possible for the judgment section 203 to judge whether the expiration date specified for the original image has passed or not, and if the expiration date has passed, it can transmit only original image data to the printing apparatus without including the code information that indicates settings relating to the addition of the water mark.

When the image processing apparatus 200 combines an information mark and an additional image with an original image, the composite image creation procedure is executed instead of executing step 306 in FIG. 14. The composite procedure for combining an information mark and an additional image is the same as that of the first embodiment, and therefore, a description is omitted. According to the type of the user's printer driver, it is possible for a user to select whether the image processing apparatus 200 creates a composite image or an original image based on the data and the image output section receives and outputs the image, or code information is transmitted to an external printing apparatus which functions as an image output section, and then the image output section creates a composite image or original image.

In the image processing apparatus 200, in the same manner as the image forming apparatus 10 shown in a first embodiment, settings for whether to add an additional image are associated with original image data and stored in the storage section 202 and can be read out and printed later. When the date and time on which data is read out from the storage section 202 and printed is prior to the expiration date, the judgment section 203 transmits code information that indicates settings for whether to add an additional image together with image data to an output means; or the judgment section 203 transmits a composite image that combines an original image with an additional image and an information mark by the image processing section 210 to the printing apparatus. On the other hand, if the date and time on which data is printed is after the expiration date, only original image data is transmitted to the printing apparatus.

Figure 16:
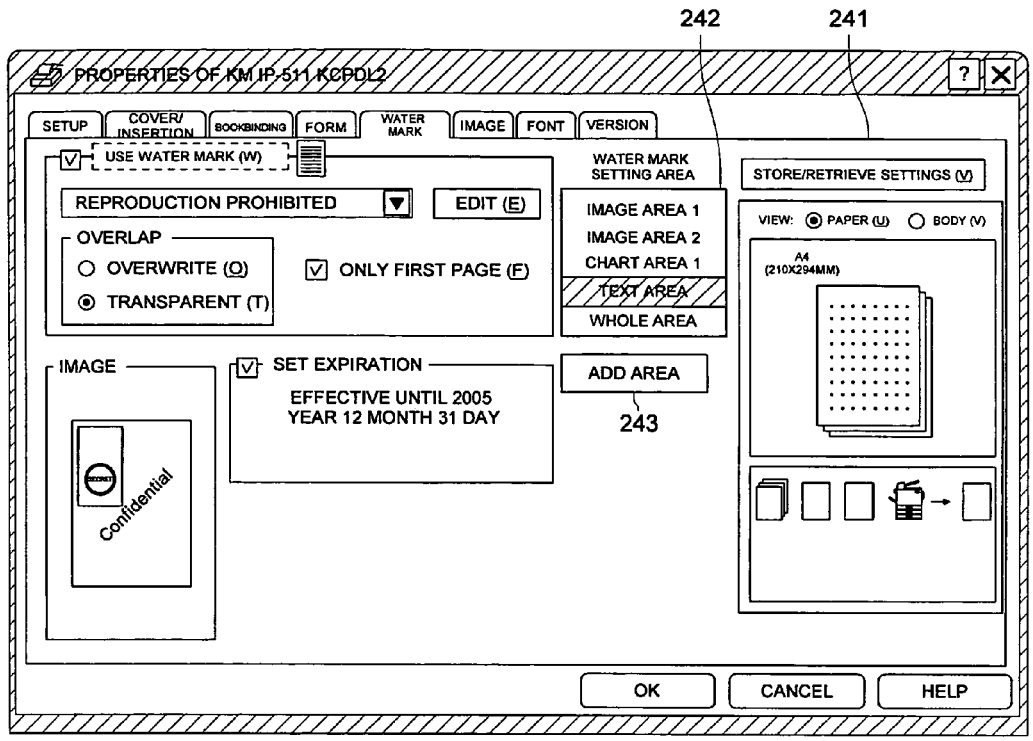
FIG. 16 is an explanatory drawing showing an example of the plurality of water mark setting screen displayed by an image processing apparatus.
Figure 17:
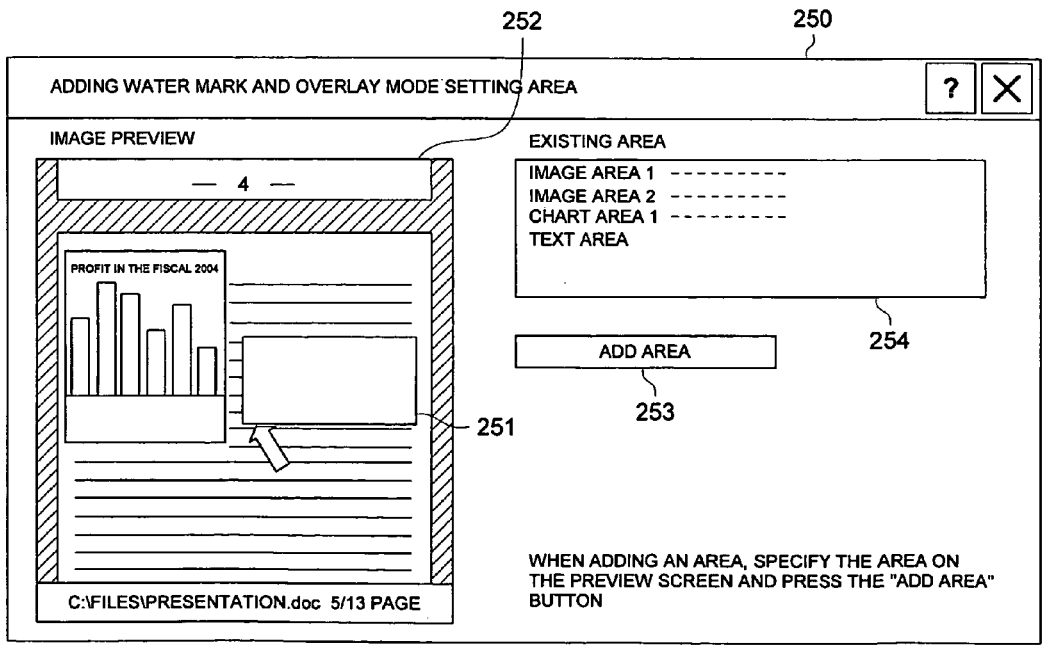
FIG. 17 is an explanatory drawing showing an example of the Add area screen displayed by an image processing apparatus.

FIG. 16 shows an example of the water mark setting screen 241 on which an additional image and its expiration date can be specified for each of a plurality of areas. For each area displayed in the "Water mark setting area" selection box 242, the presence or absence of the water mark, type of the water mark, and its expiration date can be individually specified. Operating the "Add area" button 243 will display the add area screen 250, shown in FIG. 17, which enables a new area to be added.

On the add area screen 250, by specifying an area 251 to be added in the preview area 252 and operating the "Add area" button 253, the range specified in the preview area 252 will be newly added, and the area name will be additionally displayed in the existing area 254. In this example, an area name is automatically assigned, however, it is possible for a user to specify the name.

Figure 18:
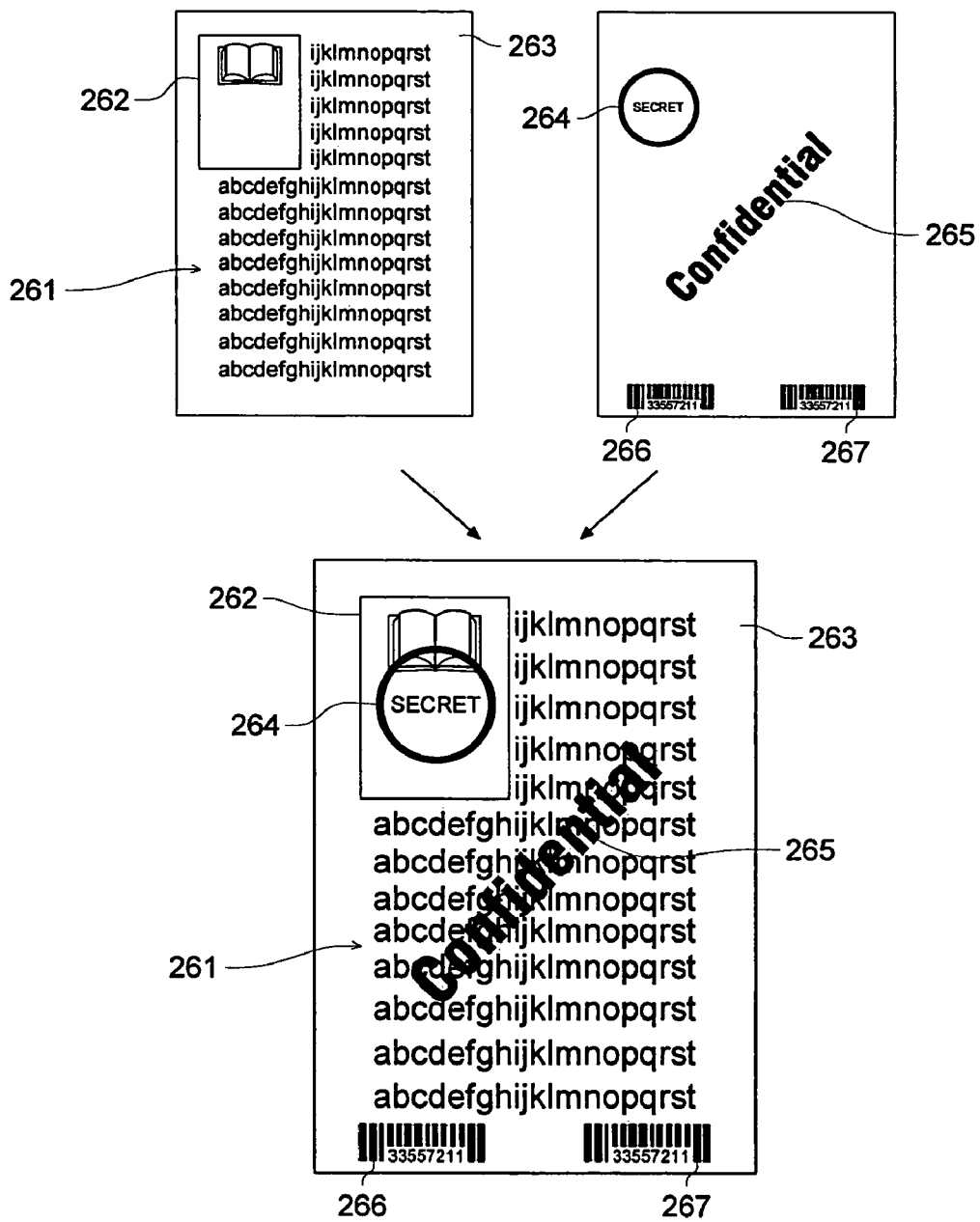
FIG. 18(a), FIG. 18(b) and FIG. 18(c) are explanatory drawings showing a composite image that includes two water marks in two areas.

FIG. 18(a), FIG. 18(b) and FIG. 18(c) show an example of a composite image that is to be outputted when water marks are set for two areas. A first image area 262 and a text area 263 have been set for the original image 261 shown in FIG. 18(a). Furthermore, the "SECRET" mark 264 with a specified expiration date is specified for the first image area 262 and the "Confidential" mark 265 with another specified expiration date is specified for the text area 263 as additional images.

As shown in FIG. 18(b), images to be combined with an original image 261 include the "SECRET" mark 264 and the information mark 266 showing the expiration date, and the "Confidential" mark 265 and information mark 267 showing the expiration date. The information mark 266 and the information mark 267 are arranged in the bottom margin of the page. FIG. 18(c) shows a composite image that combines an original image 261 shown in FIG. 18(a) with additional images 264 and 265 and information marks 266 and 267 shown in FIG. 18(b).

Figures 19, 20:
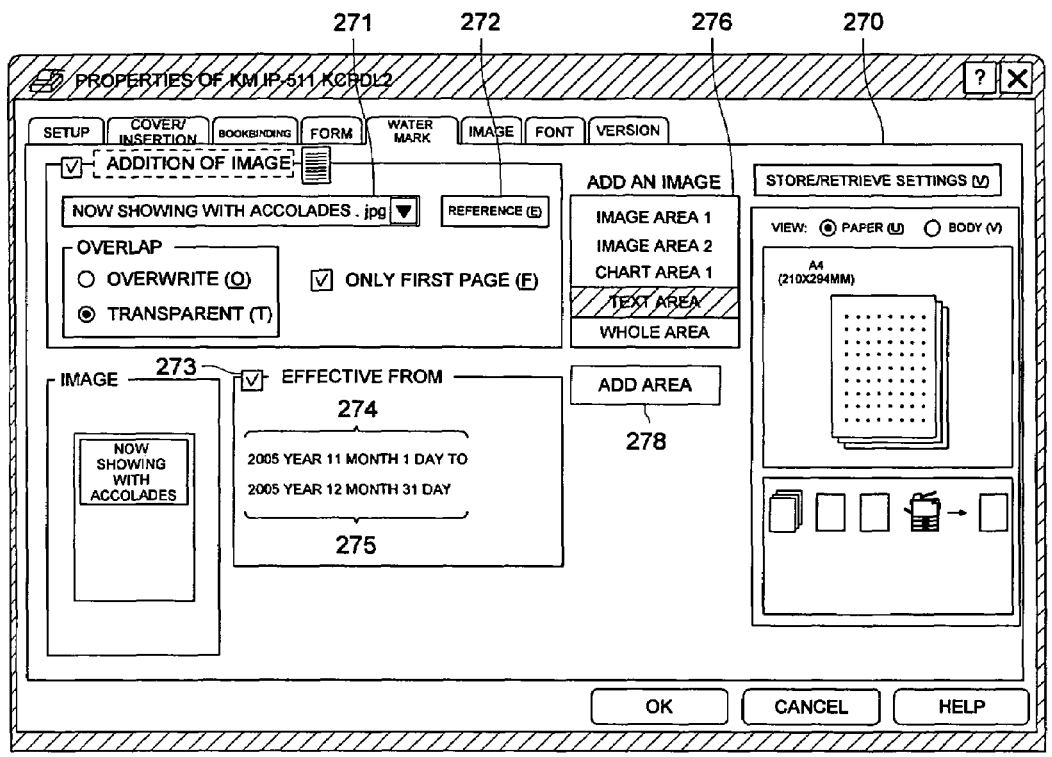
FIG. 19 is an explanatory drawing showing an example of the arbitrary image setting screen displayed by an image processing apparatus.
FIG. 20 is an explanatory drawing showing an example of setting data when a plurality of additional images are specified.

An additional image specified for each area is not intended to be limited to a water mark, but can be any image specified by a user. FIG. 19 shows an example of the arbitrary image setting screen 270 which enables a user to select any image as an additional image. Provider information that indicates the storage location and file name of the image to be added is to be entered in the input box 271. Operating the "Refer" button 272 will display the tree structure indicating the image file storage location, so that the target image file can be selected with reference to the tree structure.

Furthermore, herein, it is possible to specify an addition start date (period start date) and an addition end date (period end date) for each additional image. Checking the "Set addition period" check box 273 will enable an addition period to be specified, and a addition start date is entered in the start day input field 274, and an addition end date is entered in the end day input field 275. Unchecking the "Set addition period" check box 273 will specify "No expiration" for the addition period.

Furthermore, it is possible to specify one or more arbitrary images as additional images for each area displayed in the "Image setting area" selection box 276. Operating the "Add area" button 278 will enable a new area to be added. On this screen, date and time information and one or more additional images can be specified for each area; however, it is also possible to specify one or more additional images, and date and time information as well as the additional image inclusion area can be specified for each additional image.

FIG. 20 shows an example of set data 280, when a plurality of additional images are set. In this preset data 280, date and time information and an area, in which the additional image is to be added, are set for every additional image. The file name of the original image is registered at the head of the preset data. In this example, the file name is "Movie hand bill.doc.". In the preset data 280, additional image provider information, name of the additional image inclusion area, addition start date, and the addition end date, which are arranged in a horizontal row below the file name, configure settings relating to one "addition" operation. If the addition start date or addition end date is vacant ("- - - -" is shown in the drawing), the date has not been specified.

With regard to set data 281 for an additional image having provider information of "URL1/Soon to be released.img", the additional area is the first image area, the addition start date is not specified, and the addition end date is Nov. 30, 2005. With regard to set data 282 for an additional image having provider information of "URL2/Coming soon.img", the additional area is the first image area, the addition start date is Dec. 1, 2005, and the addition end date is Dec. 19, 2005. Furthermore, with regard to set data 283 for an additional image having provider information of "URL3/Now showing.img", the additional area is the first image area, the addition start date is Dec. 20, 2005, and the addition end date is not specified. If image data having such settings is stored in storage section 202, it is possible to automatically change an additional image that is included in the first image area according to the date on which data is printed.

Figure 21:
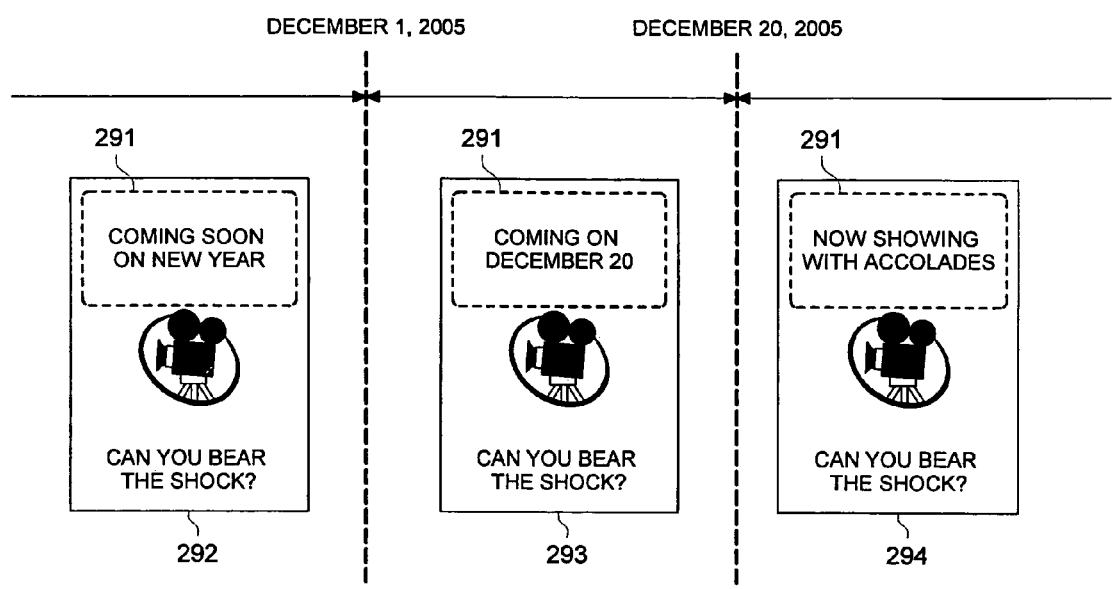
FIG. 21 is an explanatory drawing showing a relationship between the printing date of the "Movie hand bill.doc" file having settings shown in FIG. 20 and its output result.

FIG. 21 shows the correspondence of the printing date to the output result when print data of "Movie hand bill.doc" shown in FIG. 20 is printed. If the data is printed by Nov. 30, 2005, a character string of "Coming soon on New Year" is included in the first image area 291 and a "Coming soon" hand bill 292 is outputted.

If the data is printed between Dec. 1 and Dec. 19, 2005, another "Coming soon" hand bill 293 is outputted which has a character string of "Coming on December 20" in the first image area 291. If the data is printed after Dec. 20, 2005, a "Now showing" hand bill 294 is outputted which has a character string of "Now showing with accolades" in the first image area 291.

Thus, by diversifying settings of whether to add or not to add an additional image to a single original image by using date and time information, it is possible to automatically change the additional image to be added according to the specified date and time information, thereby reducing troublesome procedures to manage printing contents according to the output date and time. Moreover, FIG. 21 shows an output example in which a setting has been made so that the information mark is not combined and printed.

When combining an information mark, it is possible to indicate provider information, area information about the name and position of the additional image inclusion area, and date and time information that indicates an addition start date and addition end date as images, such as two-dimensional barcodes, and then add the created provider information image, area information image, and the date and time information image. In this case, it is suggested not adding information marks relating to additional images which have an addition end date that has passed when the data is outputted. For example, when the "Movie hand bill.doc" print data, shown in FIG. 20, is outputted on Dec. 10, 2005, it is recommended that information marks corresponding to preset data 281 should not be added, and only information marks corresponding to preset data 282 and preset data 283 be added.

Thus, embodiments of the present invention have been explained with reference to the drawings. However, specific configurations are not intended to be limited to the embodiments, and can be embodied in a variety of forms with changes and additions as long as they do not depart from the concept of the present invention.

For example, in a second embodiment, the setting section 201 functions as a printer driver; however, it is also possible to incorporate functions of the setting section 201 and the image processing section 210 into software such as word processing software. In this case, it is recommended that settings for whether to add an additional image be embedded in the header of the print data file created by a word processor.

In a second embodiment, a printer driver for outputting an expiration date as code information and another printer driver for outputting a composite image are separately provided; however, it is also possible for one printer driver to function in both ways. In this case, it is possible for a user to select whether to output code information or an composite image, or the selection can be made automatically by the printer driver side according to whether the receiving side printer includes a function to create a composite image.

Furthermore, it is also recommended that whether to add or not to add an information mark to an original image can be selected. For example, when it is assumed such an operating mode that print data, having settings of the inclusion of an additional image, are stored in advance, and a judgment of whether to add or not to add the additional image is executed only for the printer driver side when the print data is printed, it is not necessary to provide expiration date information (date and time information) for the printout result, and therefore, it is recommended not to combine information mark with an original image. Since an unnecessary information mark is not added, artistically pleasing printed matter can be obtained.

In the embodiments, date and time information is expressed as the date; however, it is possible to include time, minute, and second. Furthermore, if an IC tag has been embedded in the recording paper, it is possible to write the date and time information, represented by the information mark (date and time information image) in the aforementioned first and second embodiments, in the IC tag. Moreover, when content of information is not comprehensive because it is indicated as a one-dimensional or two-dimensional barcode, it is recommended that an expiration date and other contents be additionally displayed by using comprehensive characters and/or symbols.

Additional images are not intended to be limited to those shown in the embodiments, and any image can be used. For example, if an image is somewhat restricted by a copyright, it is recommended that date and time information which indicates whether to add or not to add the additional image be set according to the restriction.

Furthermore, in the embodiments, information marks are combined in the bottom margin of the page; however, those marks can be included in any other locations. It is preferable that those marks be located at any corner: upper, lower, right or left. In the first and second embodiments, date and time information is used to set the expiration date for adding an additional image and/or a date and time information image, and when the image output date and time matches the date and time information, the additional image and/or the date and time information image are added, and when the image output date and time does not match the date and time information, the additional image and/or the date and time information image are deleted. However, other than this example, the following configurations are also applicable: when the image output date and time matches the date and time information which specifies the image output date and time, an additional image and/or a date and time information image are removed and only an original image is outputted; and when the image output date and time does not match the date and time information, an additional image and/or a date and time information image are added and the composite image is outputted.

In short, it is sufficient to judge whether to add or remove an additional image and/or a date and time information image based on the date and time information and execute the procedures when the image is outputted according to the image data.

Moreover, in the present invention, "output" means an action that results in visual representation of data in a printed or displayed form. An image output section has a display section, such as a liquid crystal display, and/or a printer section for forming images on the recording paper. Furthermore, the image output section can also have a data transmission section for transmitting data to an external display section and/or a printer section on the premise that the data is to be outputted in a visible form by a similar external display section and/or a printer section.

According to the present invention, at least one of the following effects can be attained.

1). According to at least one of aspect of the present invention, date and time information is specified for image data so that the date and time information becomes a reference for whether to add or not to add an additional image when the image data is outputted, and therefore, it is possible to automatically judge whether to add or not to add an additional image based on the date and time information when the image data is outputted, thereby reducing the number of management procedures to add or not to add an additional image according to the output period. That is, troublesome management procedures are reduced in which two kinds of image data, with or without an additional image, are created and used appropriately according to the output period, thereby improving convenience of operations.

2). Especially in cases when date and time information is expiration date information that indicates the end of the period in which an additional image is to be added, when the "Confidential" mark is to be added as an additional image to a document having a confidentiality expiration date, the "Confidential" mark is not automatically added after the confidentiality time period has expired. As a result, it is easy to produce the proper output result according to the confidentiality expiration date.

3). In cases when date and time information is the date and time at which an additional image begins to be added or the date and time at which an additional image ceases to be added, or indicates both dates and time, it is possible to add an additional image before certain date and time passes and not add it after the certain date and time has passed, or not to add an additional image before certain date and time passes and add it after the certain date and time has passed, or to combine both situations. Thus, it is possible to add or not to add an additional image in many ways according to the sequence of the output date and time.

4). In cases when date and time information can be specified for each of a plurality of areas provided in the image, or in cases when date and time information can be specified for each additional image that is to be added at the time of the output, it is possible to manage the output period to add an additional image according to each additional image or each area even if a plurality of additional images and a plurality of areas are provided in one image. As a result, it is possible to flexibly manage changes of output contents in many ways according to differences of output date and time.

5). In cases when date and time information, area information, and additional image provider information are to be transmitted in the form of code information to the printer section, it is possible for the printer section to easily judge whether to add or not to add an additional image by simply analyzing the code information. On the other hand, in cases when the above information is displayed as such an image as a two-dimensional barcode, and composite image data that combines that image with an original image is transmitted to the output section, the output result that includes the date and time information image can be reproduced by the output section by simply printing the image indicated by the composite image data. Consequently, it is not necessary for the output section to include a function which combines images such as a date and time information image.

6). Furthermore, in cases when an original image or an additional image is reduced or moved because there is no space for combining those images, it is possible to prevent the date and time information image from being misrecognized when it is analyzed as well as preventing the image from overlapping with other images. As a result, deterioration of the original image can be reduced.

7). In cases when composite image data, which combines the image indicated by image data with an additional image according to date and time information, is to be created and transmitted, it is possible to obtain an output result that includes the additional image even if the output section does not include a function to combine an additional image. As a result, it is beneficial that any output section can be used.

It is to be noted that various changes and modifications will be apparent to those skilled in the art. Therefore, unless such changes and modifications depart from the scope of the present invention, they should be construed as being included therein.

What is claimed is:

1. An image processing apparatus, comprising:
   an image signals obtaining section which obtains image signals corresponding to an image;
   an additional image setting section which sets an additional image with the image corresponding to the image signals;
   a day and time information setting section which sets a day and time information used for judging whether the image is outputted with or without an additional image in outputting the image based on the image signals; and
   a judgment section which judges whether the date and time information meets date and time for output when the image is outputted based on the image signals,
   wherein the output section outputs the image without the additional image when the judgement section judges the date and time information meets the date and time for output, and outputs the image with the additional image when the judgment section judges the date and time information does not meet the date and time for output.

2. The image processing apparatus of claim 1, wherein the output section outputs a composite image based on the image signals corresponding to the image and an image signals corresponding to the additional image.

3. The image processing apparatus of claim 2, further comprising: a transmission section which transmits the image signals corresponding to the image and the image signals corresponding to the additional image to the output section.

4. The image processing apparatus of claim 2, further comprising:
   an image process section which creates the composite image based on the image signals corresponding to the image and the image signals corresponding to the additional image; and
   a transmission section which transmits an image signals corresponding to the composite image to the output section.

5. The image processing apparatus of claim 1, wherein the output section outputs the image based on the image signals, and the output section does not use an image signals corresponding to the additional image in outputting the image.

6. The image processing apparatus of claim 5, further comprising: a transmission section which transmits the image signals corresponding to the image to the output section, wherein the transmission section does not transmit the image signals corresponding to the additional image to the output section.

7. The image processing apparatus of claim 5, further comprising:
   an image process section which creates the image based on the image signals; and
   a transmission section which transmits the image corresponding to the image to the output section, wherein the image process section does not use the image signals corresponding to the additional image in creating the image.

8. The image processing apparatus of claim 2, wherein the output section outputs the image without an image relating to date and time information when the judgment section judges the date and time information meets the date and time for output, and outputs the image with the image relating to date and time information based on the date and time information when the judgment section judges the date and time information does not meet the date and time for output.

9. The apparatus of claim 8, wherein the output section outputs a reduced size image of the composite image in accordance with a result of judgment whether the composite image and the image relating to date and time information are overlap with each other.

10. The apparatus of claim 8, wherein the output section outputs the image relating to date and time information so as not to interfere with a reduced size image of the composite image.

11. The image processing apparatus of claim 2, wherein the output section outputs the image with an image relating to date and time information based on the date and time information when the judgment section judges the date and time information meets the date and time for output, and outputs the image without the image relating to date and time information when the judgment section judges the date and time information does not meet the date and time for output.

12. The apparatus of claim 11, wherein the output section outputs a reduced size image of the composite image in accordance with a result of judgment whether the composite image and the image relating to date and time information are overlap with each other.

13. The apparatus of claim 11, wherein the output section outputs the image relating to date and time information so as not to interfere with a reduced size image of the composite image.

14. The image processing apparatus of claim 1, wherein the output section outputs the image with the additional image when the judgment section judges the date and time information meets the date and time for output, and outputs the image without the additional image when the judgment section judges the date and time information does not meet the date and time for output.

15. The image processing apparatus of claim 14, wherein the output section outputs a composite image based on the image signals corresponding to the image and an image signals corresponding to the additional image.

16. The image processing apparatus of claim 15, further comprising: a transmission section which transmits the image signals corresponding to the image and the image signals corresponding to the additional image to the output section.

17. The image processing apparatus of claim 15, further comprising:
an image process section which creates the composite image based on the image signals corresponding to the image and the image signals corresponding to the additional image; and
a transmission section which transmits an image signals corresponding to the composite image to the output section.

18. The image processing apparatus of claim 14, wherein the output section outputs the image based on the image signals, and the output section does not use an image signals corresponding to the additional image in outputting the image.

19. The image processing apparatus of claim 18, further comprising: a transmission section which transmits the image signals corresponding to the image to the output section, wherein the transmission section does not transmit the image signals corresponding to the additional image to the output section.

20. The image processing apparatus of claim 18, further comprising:
an image process section which creates the image based on the image signals; and
a transmission section which transmits the image corresponding to the image to the output section, wherein the image process section does not use the image signals corresponding to the additional image in creating the image.

21. The image processing apparatus of claim 15, wherein the output section outputs the image without an image relating to date and time information when the judgment section judges the date and time information meets the date and time for output, and outputs the image with the image relating to date and time information based on the date and time information when the judgment section judges the date and time information does not meet the date and time for output.

22. The apparatus of claim 21, wherein the output section outputs a reduced size image of the composite image in accordance with a result of judgment whether the composite image and the image relating to date and time information are overlap with each other.

23. The apparatus of claim 21, wherein the output section outputs the image relating to date and time information so as not to interfere with a reduced size image of the composite image.

24. The image processing apparatus of claim 15, wherein the output section outputs the image with an image relating to date and time information based on the date and time information when the judgment section judges the date and time information meets the date and time for output, and outputs the image without the image relating to date and time information when the judgment section judges the date and time information does not meet the date and time for output.

25. The apparatus of claim 24, wherein the output section outputs a reduced size image of the composite image in accordance with a result of judgment whether the composite image and the image relating to date and time information are overlap with each other.

26. The apparatus of claim 24, wherein the output section outputs the image relating to date and time information so as not to interfere with a reduced size image of the composite image.

27. The image processing apparatus of claim 1, wherein the day and time information setting section sets the day and time information with the additional image.

28. The image processing apparatus of claim 1, wherein the day and time information setting section sets the day and time information with an area where the additional image is added.

29. The image processing apparatus of claim 1, wherein the day and time information setting section sets a first day and time information representing start day and time and/or a second day and time information representing end day and time.

30. The image processing apparatus of claim 1, wherein the additional image setting section sets a plurality of the additional images with the image corresponding to the image signals.

31. The image processing apparatus of claim 30, wherein the output section outputs the image with the additional image based on the day and time information.

32. The image processing apparatus of claim 1, wherein the output section includes a printer section.

33. The image processing apparatus of claim 1, wherein the output section includes a display section.

34. The image processing apparatus of claim 1, wherein image signals obtaining section is a reading section which reads an original document having the image.

35. The image processing apparatus of claim 1, wherein image signals obtaining section is an interface section which has a function to receive the image signals.

36. An image processing apparatus, comprising:
an image signals obtaining section which obtains image signals corresponding to an image;
a judgment section which judges whether date and time information meets date and time for output when the image is outputted based on the image signals, wherein the date and time information is used for judging whether the image is outputted with or without an additional image; and
an output section which outputs the image with or without the additional image in accordance with a result of judgment whether the date and time information meets the date and time for output,
wherein the output section outputs the image without the additional image when the judgment section judges the date and time information meets the date and time for output, and outputs the image with the additional image when the judgment section judges the date and time information does not meet the date and time for output.

37. The image processing apparatus of claim 36, wherein the output section outputs the image with the additional image when the judgment section judges the date and time information meets the date and time for output, and outputs the image without the additional image when the judgment section judges the date and time information does not meet the date and time for output.

38. The image processing apparatus of claim 36, further comprising: an additional image setting section which sets the additional image with the image corresponding to the image signals.

39. The image processing apparatus of claim 36, wherein the additional image is set with the image corresponding to the image signals by an external additional image setting section.

40. The image processing apparatus of claim 36, further comprising: a day and time information setting section which sets the day and time information with the image corresponding to the image signals.

41. The image processing apparatus of claim 40, wherein the day and time information setting section sets the day and time information with the additional image.

42. The image processing apparatus of claim 40, wherein the day and time information setting section sets the day and time information with an area where the additional image is added.

43. The image processing apparatus of claim 40, wherein the day and time information is obtained from an original document having the image.

44. The image processing apparatus of claim 43, wherein the day and time information is obtained by reading the original document.

45. The image processing apparatus of claim 36, wherein the day and time information is set with the image corresponding to the image signals by an external day and time information setting section.

46. The image processing apparatus of claim 36, wherein the output section includes a printer section.

47. The image processing apparatus of claim 36, wherein the output section includes a display section.

48. The image processing apparatus of claim 36, wherein image signals obtaining section is a reading section which reads an original document having the image.

49. The image processing apparatus of claim 36, wherein image signals obtaining section is an interface section which has a function to receive the image signals.

* * * * *